Nov. 28, 1939.  J. T. LABBE  2,181,277
LOAD INDICATOR FOR TRUCKS
Filed Aug. 16, 1937   2 Sheets-Sheet 1
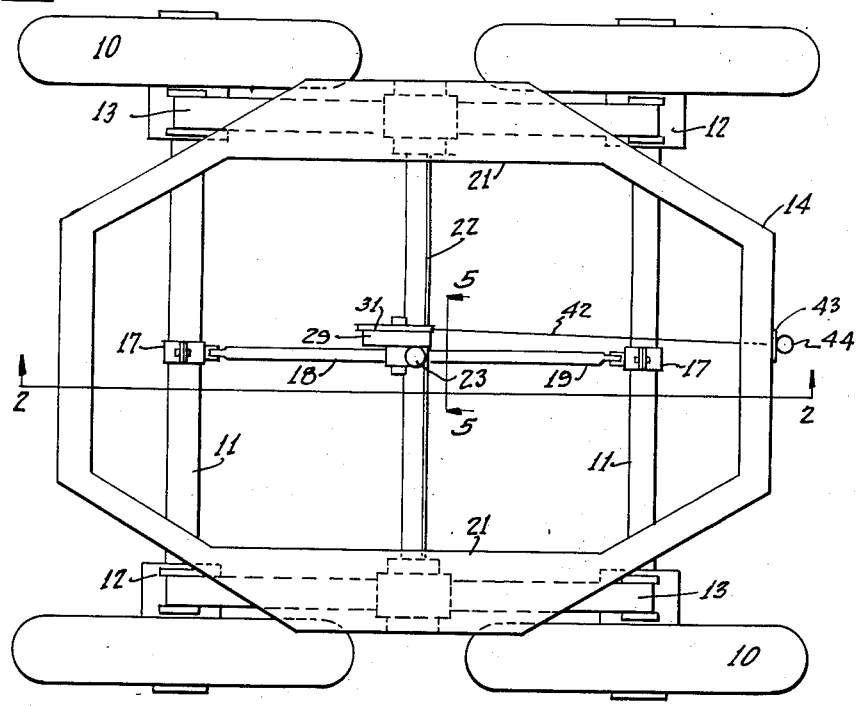
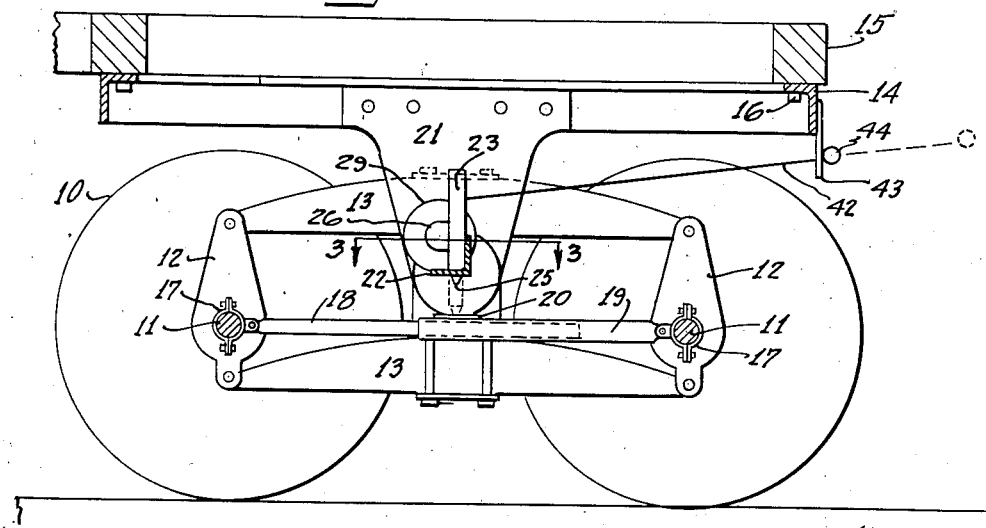
INVENTOR
J. T. LABBE
ATTORNEY

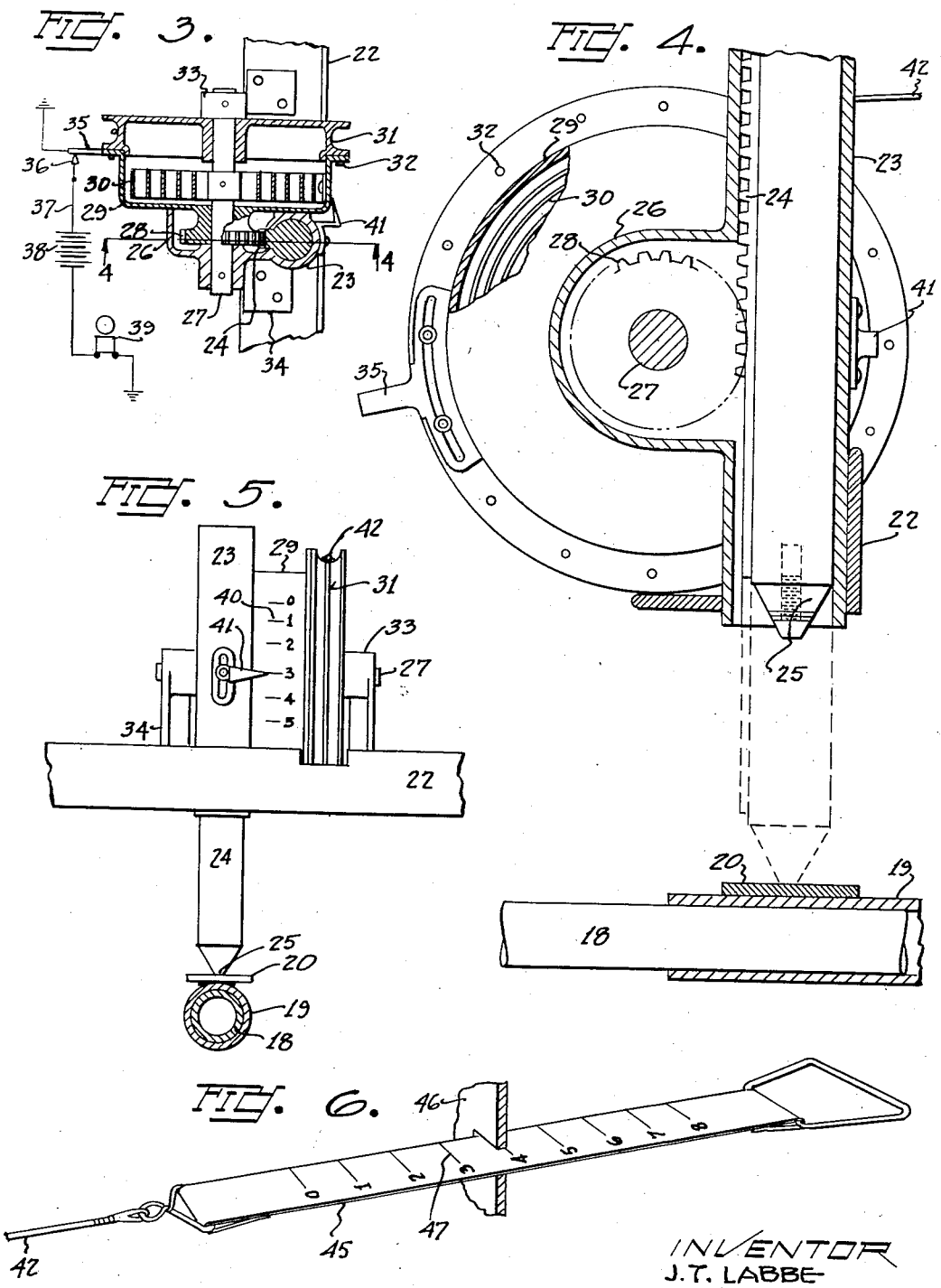

Patented Nov. 28, 1939

2,181,277

UNITED STATES PATENT OFFICE 2,181,277

LOAD INDICATOR FOR TRUCKS

John T. Labbe, Portland, Oreg.

Application August 16, 1937, Serial No. 159,364

4 Claims. (Cl. 265—40)

This invention relates generally to land travelling vehicles, and particularly to a load indicator for trucks.

The main object of this invention is the construction of a simple and efficient form of load indicator for trucks which will be unaffected by sudden loading or unloading of the truck or by movements of the truck load during transportation periods.

The second object is the construction of an indicator which will be inexpensive to build and not easily rendered inoperative due to the fact that is is placed in an indicating condition only when a load reading is being taken.

The third object is the provision of a means for audibly indicating an overload.

The fourth object is the construction of a device of the class described which will be applicable to dual axle trailers and in which the flexing of the trailer springs is utilized for the purpose of determining the weight of the load resting on the trailer.

I accomplish these and other objects in the manner set forth in the following specification as illustrated in the accompanying drawings, in which:

Fig. 1 is a plan of the trailer assembly showing the position of the load indicator.

Fig. 2 is a section taken along the line 2—2 in Fig. 1.

Fig. 3 is a section taken along the line 3—3 in Fig. 2.

Fig. 4 is a section taken along the line 4—4 in Fig. 3 showing the inoperative position in full lines and the operative position in dotted lines.

Fig. 5 is a section taken along the line 5—5 in Fig. 1.

Fig. 6 is a perspective view of an alternate form of load indicating scale.

Similar numerals refer to similar parts throughout the several views.

Referring in detail to the drawings, there is shown for the purpose of illustration a set of trailer wheels 10 which are mounted on the axles 11. The axles 11 are provided with the shackle bars 12 across the upper and lower ends of which are secured the springs 13. Mounted on the springs 13 is a trailer frame 14 which is secured to the sills 15 by means of the bolts 16.

Secured to the axles 11 by means of the hinged clamps 17 are the telescoping members 18 and 19 which constitute a gauging member. On the top side of the telescoping member 19 is disposed a flat pad 20. Between the sides 21 of the trailer frame 14 is secured an angle bar 22 upon which is mounted the upright guide 23 in which is slidably disposed the rack 24 whose lower end 25 terminates in a blunt point which is adapted to engage the pad 20 when the rack 24 is depressed.

A housing 26 forms a part of the guide 23 and has secured therein a shaft 27 on which is rotatably mounted the pinion 28 which meshes with the rack 24. Forming a part of the pinion 28 is a flanged barrel 29 in which is placed the spiral spring 30, one end of which is attached to the barrel 29 and the other end of which is attached to the shaft 27. Rotatably mounted on the shaft 27 is a pulley 31 which is secured to the barrel 29 by means of the screws 32. A bearing 33 supports the outer end of the shaft 27.

The housing 26 is attached to the bar 22 by means of a bracket 34. A contact arm 35 is mounted on the pulley 31 and is so positioned as to engage the contact 36 which is joined by a wire 37 to the battery 38 which supplies current to the bell 39, one side of which is grounded.

The barrel 29 is provided with calibrations 40 which indicate the weight of the load. An indicating pointer 41 is secured to the guide 23 and extends across the path of the calibrations 40. A cord or cable 42 is secured to the pulley 31 and wound several times around same and has its free end pass through a bracket 43 and provided with a ring 44 by means of which it may be manually operated.

It will be understood that the action of the spring 30 is such as to cause the lower end 25 of the rack 24 to be urged to the uppermost position such as is shown in full lines in Fig. 4 where it remains at all times except when a reading is being taken. If it is desired to check a load, the operator merely pulls the ring 44 to the position shown in dotted lines in Fig. 2 thereby causing the pulley 31 to revolve and the pinion 28 to revolve in opposition to the spring 30 and also causing the end 25 to descend until it touches the pad 20 which forms a part of the gauging member 19. Naturally, the distance which the rack 24 can descend will depend upon the amount it has been lowered by the load itself so that the relative movement may be utilized to indicate the weight on the truck.

It will be noted that when the contact arm 35 engages the contact 36 that current will flow to the bell 39 which means that the arm 35 must be so positioned with relation to the member 36 that the contact will be made and the bell 39 sounded when the springs 13 are deflected by the maximum permissible load.

In the form of the device shown in Fig. 6 is shown a variation of the form illustrated in the previous figures in that a tape 45 is employed with a cable 42 and the tape 45 passes through a stationary indicator 46 so that weight indicated by the graduations 47 may be read directly from the tape 45 instead of from the barrel 29 as in the first described form of the device. It will be understood that the stationary indicator 46 is identical with the member 43.

It will be noted from the foregoing that with this construction the indicator is inoperative at all times except that the instant it is desired to take the reading and this should always be when the load or fraction thereof has been placed on the truck in order to avoid the destructive action of dropping loads on the truck as is commonly the case.

I claim:

1. A load indicating device for trucks consisting of a pair of wheeled dual axles, a telescopic gauge member supported by both of said axles and normal thereto, a trailer frame mounted over said axles, springs interposed between said trailer frame and axles, a plunger slidably secured to said trailer frame normal to said gauge member, a spring for urging said plunger out of engagement with said gauge member, a measuring tape attached to said plunger and an indicator attached to said truck frame constituting a support for said tape.

2. A device of the class described having in combination a gauge member adapted to be mounted across the dual axles of a vehicle, a spring supported by said axles, a frame supported by said spring, a plunger slidably mounted over said gauge member and normal thereto, a rack and pinion for actuating said plunger in a downward direction, a spring for urging said plunger in an upward direction, a drum attached to said pinion, a measuring tape attached to said drum having graduated weight readings thereon and a stationary indicator having a slot therein through which said tape passes and on the sides of which said tape can be read.

3. In a load measuring device the combination of a pair of dual axles, a gauge member having its ends supported upon said axles midway between the ends thereof, a spring mounted load carrying frame supported by said axles, a guide attached to said frame, a slide mounted in said guide normal to said gauge member and capable of contacting same between the ends thereof, a spring for urging said slide away from said gauge member, a measuring tape connected to said slide whereby same may be manually moved into contact with said gauge member, said measuring tape having graduated weight readings thereon and a stationary indicator secured to said truck frame against which readings may be taken upon said tape.

4. A load indicating device for trucks consisting of a pair of wheeled dual axles, a telescopic gauge member supported by both of said axles and normal thereto, a trailer frame mounted over said axles, springs interposed between said trailer frame and axles, a plunger slidably secured to said trailer frame normal to said gauge member and means for determining the deflection of said springs constituting a measuring device for gauging the position of said trailer frame with relation to said gauge member.

JOHN T. LABBE.